US009414355B1

(12) United States Patent
Pandey

(10) Patent No.: US 9,414,355 B1
(45) Date of Patent: Aug. 9, 2016

(54) METHODS AND SYSTEMS FOR PAGING BASED ON COMMUNICATION TYPE

(71) Applicant: Sprint Spectrum L.P., Overland Park, KS (US)

(72) Inventor: Chandra Pandey, Temecula, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 232 days.

(21) Appl. No.: 14/060,567

(22) Filed: Oct. 22, 2013

(51) Int. Cl.
*H04W 68/02* (2009.01)

(52) U.S. Cl.
CPC ..................................... *H04W 68/02* (2013.01)

(58) Field of Classification Search
CPC .......................................... H04W 68/00–68/12
See application file for complete search history.

(56) References Cited

U.S. PATENT DOCUMENTS

| | | | | | |
|---|---|---|---|---|---|
| 4,881,073 | A | * | 11/1989 | Andros | G08B 3/1008 340/7.27 |
| 5,121,115 | A | * | 6/1992 | Andros | H04W 84/022 340/7.27 |
| 5,313,197 | A | * | 5/1994 | Barr | H04W 88/185 340/7.21 |
| 6,185,421 | B1 | * | 2/2001 | Alperovich | H04W 68/00 455/433 |
| 6,545,996 | B1 | * | 4/2003 | Falco | H04W 72/1242 370/347 |
| 6,745,039 | B1 | * | 6/2004 | Di Lalla | H04W 68/04 455/422.1 |
| 8,000,684 | B1 | * | 8/2011 | Bhan | H04W 52/38 455/412.1 |
| 8,204,517 | B1 | * | 6/2012 | Rai | H04W 68/02 455/422.1 |
| 2005/0009534 | A1 | * | 1/2005 | Harris | H04W 68/00 455/453 |
| 2005/0181767 | A1 | * | 8/2005 | Boland | H04M 3/537 455/412.2 |
| 2006/0217118 | A1 | * | 9/2006 | Benco | H04W 68/00 455/435.1 |
| 2006/0246924 | A1 | * | 11/2006 | Balasubramanian | H04W 68/00 455/459 |
| 2006/0270422 | A1 | * | 11/2006 | Benco | H04W 68/04 455/458 |
| 2007/0105535 | A1 | * | 5/2007 | Jacobson | H04W 4/14 455/414.1 |
| 2009/0181647 | A1 | * | 7/2009 | Benco | H04W 68/02 455/413 |
| 2009/0227265 | A1 | * | 9/2009 | Kang | H04W 60/04 455/456.1 |
| 2010/0214317 | A1 | * | 8/2010 | Miura | H04L 12/12 345/641 |
| 2010/0323725 | A1 | | 12/2010 | Cai et al. | |
| 2011/0306363 | A1 | * | 12/2011 | Wang | H04W 24/02 455/456.1 |
| 2014/0094201 | A1 | * | 4/2014 | Knauft | H04W 68/12 455/458 |
| 2014/0113666 | A1 | * | 4/2014 | Arvidsson | H04W 68/00 455/458 |
| 2014/0220970 | A1 | * | 8/2014 | Yang | H04W 48/20 455/434 |

FOREIGN PATENT DOCUMENTS

| | | | | |
|---|---|---|---|---|
| CH | WO 2013064381 A1 * | 5/2013 | .......... | H04W 60/005 |
| WO | WO 2013064381 A1 * | 5/2013 | .......... | H04W 60/005 |

* cited by examiner

*Primary Examiner* — Mehmood B Khan

(57) ABSTRACT

Disclosed herein are methods and systems for paging a wireless communication device in a radio access network based on a communication type. An example method may include a radio access network receiving a request to initiate a communication with a wireless communication device. The example method may also include the radio access network determining a type of the requested communication. The example method may additionally include the radio access network determining a maximum number of page attempts for a paging process of the wireless communication device based on at least the determined type. The example method may further include the radio access network initiating the paging process of the wireless communication.

15 Claims, 5 Drawing Sheets

METHODS AND SYSTEMS FOR PAGING BASED ON COMMUNICATION TYPE

BACKGROUND

A typical wireless carrier network includes a number of base stations that radiate to define wireless coverage areas, such as cells and cell sectors, in which wireless communication devices (WCDs) can operate and engage in air-interface communication with the wireless carrier network. Each base station may then be coupled with equipment that provides connectivity with one or more transport networks, such as the public switched telephone network (PSTN) and/or the Internet for instance. Within this arrangement, a WCD operating in a coverage area of the wireless carrier network can engage in communication, via the wireless carrier network, with other WCDs operating in the wireless carrier network as well as with remote entities sitting outside of the wireless carrier network.

The wireless carrier network may operate in accordance with an agreed air-interface protocol or "radio access technology," examples of which include Code Division Multiple Access (CDMA) (e.g., 1×EV-DO and 1×RTT), Long Term Evolution (LTE) (e.g., FDD LTE and TDD LTE), WiMAX, iDEN, TDMA, AMPS, Global System for Mobile Communications (GSM), GPRS, UMTS, EDGE, MMDS, WI-FI, and BLUETOOTH. Generally, the agreed air-interface protocol may define a downlink (or forward link) for carrying communications from the base stations to WCDs and an uplink (or reverse link) for carrying communications from WCDs to the base stations. Further, the agreed air-interface protocol may employ techniques such time-division multiplexing, frequency-division multiplexing, and/or code-division multiplexing to divide the downlink and uplink into discrete resources (e.g., LTE resource blocks, 1×EV-DO timeslot resources, etc.), which may then be used to carry control and/or bearer data between the base station and particular WCDs.

OVERVIEW

A radio access network (RAN) may initiate a number of different communications with WCDs, some of which may be classified as one of two communications types: connection-dependent communications and connectionless communications. Connection-dependent communications may be communications that require the RAN to establish a sustained communication link between a WCD and the RAN to support bidirectional data transmissions and/or transmission of a large quantity of data to the WCD. Examples of connection-dependent communications may include voice calls, video calls, streaming media services, Internet data sessions, and the like. In contrast, connectionless communications may be communications that do not require the RAN to establish a communication link because of the relatively small amount of data included in these one-time communications. Examples of connectionless communications include short message service (SMS) messages, instant messages (IMs), digital paging communications (e.g., call-back numbers), voice mail notifications, and the like.

According to a typical configuration, a RAN may initiate a requested communication session with a WCD by paging the WCD in a first paging area that typically includes the last-known coverage area of the WCD and one or more other coverage area in the vicinity of that last-known coverage area. If the WCD does not answer the first page, the RAN may then continue paging the WCD in progressively broader paging areas until either the WCD acknowledges the page or the number of page attempts equals a maximum number of transmissions. In the latter case, the RAN may not locate the WCD, in which event the RAN may not establish the requested communication session, thereby delaying the requested communication session. For some connectionless communications, however, the RAN can store the connectionless communications (e.g., an SMS message or IM) for later delivery to WCDs. In this manner, the need to locate a WCD to initiate a connectionless communication may not be as necessary as for connectionless communications as for connection-dependent communications.

However, because of the popularity of certain connectionless communications, such as SMS messages and IMs, pages associated with connectionless communications may impact the ability of a RAN to provide communication services in the RANs coverage areas. Indeed, while most connectionless communication pages may be acknowledged on the first page, a RAN may still need to retransmit a large quantity of unacknowledged pages associated with connectionless communications because of the volume of connectionless communications. This transmission of multiple pages for connectionless communications may adversely affect the RAN's ability to provide data services to connected WCDs for various reasons.

For instance, because RANs typically retransmit pages in multiple coverage areas, pages associated with connectionless communications may consume a significant amount of the RAN's paging resources, especially during peak usage times. As a result, the transmission of new pages may be delayed as a result of the RAN retransmitting pages in multiple coverage areas, which may impair the RAN's ability to establish other communications, such as connection-dependent communications.

Further, because the downlink channels in some RANs are time and frequency-aligned (e.g., traffic channel and paging channels in LTE networks), a page consumes at least some of the downlink channel bandwidth of the coverage areas in which the page is sent. Thus, in a situation where multiple paging signals are sent in multiple coverage areas, the RAN's ability to transfer data signals to other WCDs via the downlink channels may be reduced.

Further yet, in some embodiments, the RAN may also include the connectionless communication itself (e.g., an SMS message) with the paging signal, which may further consume the RAN's data resources due to the number of these connectionless communications that are retransmitted when the WCD fails to acknowledge the initial page.

Disclosed herein are methods and systems that are intended to help address these issues by reducing the number of pages for connectionless communications. According to a disclosed method, a RAN may receive a request to initiate a communication with a WCD. In response to receiving the request, the RAN may determine a type of the requested communication. Based at least in part on the determined type, the RAN may then set a maximum number of page attempts for a paging process of the WCD. In turn, the RAN may initiate the paging process of the WCD.

To further illustrate the disclosed methods, in one embodiment, the RAN may determine that the requested communication is one of two communication types: a connection-dependent type or a connectionless type. The RAN may then set a smaller maximum number of page attempts for a connectionless communication (e.g., 1 or 2 page attempts) and a larger maximum number of page attempts for a connection-dependent communication (e.g., 3 page attempts). In this way, the RAN may effectively prioritize connection-dependent communications over connectionless communications to improve the likelihood of establishing connection-dependent communications sessions, which, unlike connectionless communications, have a temporal requirement.

Advantageously, the disclosed methods may thus reduce the number of pages sent for certain communication types (e.g., connectionless communications), which may reduce the consumption of the RAN's downlink channel resources. In this manner, the disclosed methods may improve the RAN's ability to provide services to connected WCDs.

In one embodiment, the disclosed methods may take the form of a method that involves (a) receiving a request to initiate a communication with a WCD, (b) determining a type of the communication, (c) based at least in part on the determined type, determining a maximum number of page attempts for a paging process of the WCD, and (d) initiating the paging process of the WCD.

In one example, prior to initiating the paging process, the RAN may identify a paging area in which to page the WCD and determine an amount of available paging resources in the identified paging area. The RAN may then adjust the maximum number of page attempts based on the determined amount of available paging resources. In this way, the RAN may dynamically determine the maximum number of page attempts as the paging channel resources change after initiating the paging process.

The feature of initiating the paging process of the WCD may take various forms. In one example, this feature may include determining whether a number of page attempts is equal to the maximum number of page attempts. In response to determining that the number of page attempts is equal to the maximum number of transmissions, this feature may then include terminating the paging process. In another example, the method may also additionally include a feature of reinitiating the paging process of the WCD after allowing an amount of time to elapse.

In yet another example, the feature of initiating the paging process may include, in response to determining that the number of page attempts is equal to the maximum number of transmissions, identifying a paging area in which to page the WCD, determining an amount of available paging resources in the paging area, and determining whether the determined amount of available paging resources is greater than or equal to a threshold amount of paging resources. In response to the determining that the amount of available paging resources is greater than or equal to the threshold amount of paging resources, this feature may include (i) subtracting one from the number of page attempts and (ii) continuing the paging process of the WCD. The paging process may take other forms as well.

Also disclosed herein are network entities and computer-readable media configure to facilitate implementation of the disclosed methods.

These as well as other aspects and advantages will become apparent to those of ordinary skill in the art by reading the following detailed description, with reference where appropriate to the accompanying drawings.

DETAILED DESCRIPTION

Figure 1:
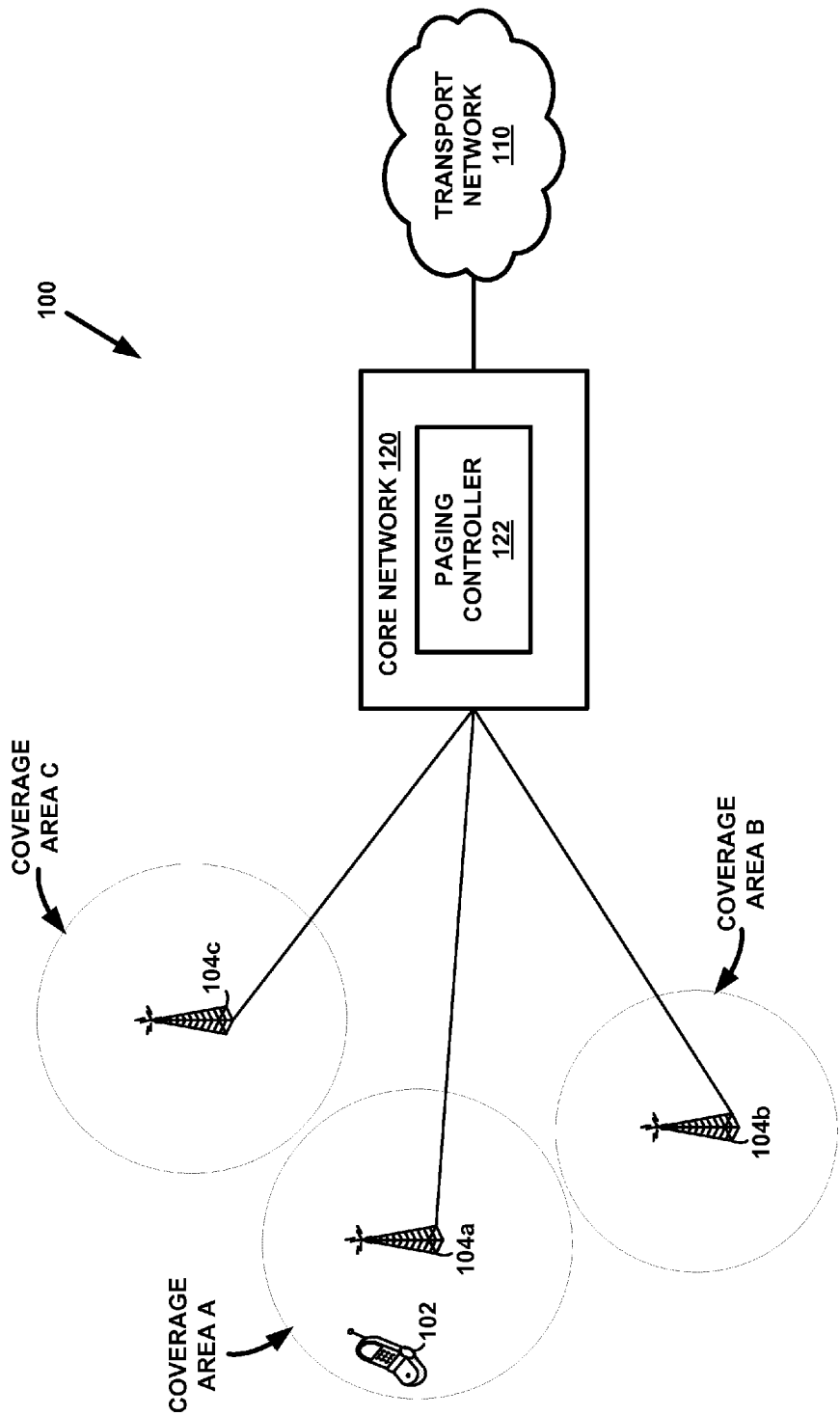
FIG. 1 is a simplified block diagram of an example communication system in which in which embodiments of the disclosed methods and entities can be implemented.

Referring to the drawings, FIG. 1 is a simplified block diagram of an example wireless communication network in which embodiments of the disclosed methods and entities can be implemented. It should be understood, however, that this and other arrangements described herein are set forth as examples only. As such, those skilled in the art will appreciate that other arrangements and elements (e.g., machines, interfaces, functions, orders of functions, etc.) can be used instead, some elements may be added, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware and/or software logic. For instance, various functions may be carried out by a processor executing instructions written in any suitable programming language and stored in memory.

As shown in FIG. 1, an exemplary network may include RAN 100 that radiates to define numerous coverage areas to facilitate communication with a plurality of WCDs (e.g., cellular telephones, tablets or other wirelessly-equipped computers, mobile hotspots, etc.), such as WCD 102, and provides connectivity with one or more transport networks (e.g., the public switched telephone network (PSTN) and/or the Internet), such as representative transport network 110. As used herein, WCDs may refer to "mobile stations," as is common when referring to WCDs in the context of a CDMA network, and/or to "user entities" (UEs), as is common when referring to WCDs in the context of an LTE network.

RAN 100 may include one or more base stations (e.g., base transceiver stations, access nodes, node-Bs, eNodeBs, etc.), each including an antenna system for emitting radio frequency (RF) radiation to define one or more coverage areas (e.g., a cell and/or cell sectors) in which the base station can engage in air-interface communications with WCDs. For example, FIG. 1 shows RAN 100 as including base stations 104a-c, each of which may radiate to provide a wireless coverage area (e.g., cell, sector, cell-sector, and the like) within which the base station provides wireless service to WCDs. As shown in FIG. 1, base station 104a may provide coverage area A, base station 104b may provide coverage area B, and base station 104c may provide coverage area C. In another example, RAN 100 may include additional or fewer coverage areas. It should be understood, however, that the depicted arrangement of base stations and coverage areas is for purposes of illustration only, and that numerous other arrangements of base stations and/or coverage areas are possible as well.

As noted above, in practice, base stations such as base stations 104a-c and WCDs such as WCD 102 may be arranged to engage in air-interface communication with each other according to an agreed air-interface protocol, examples of which include CDMA (e.g., 1×RTT or 1×EV-DO), LTE, WiMAX, IDEN, HSDPA, GSM, WI-FI, and/or any others now known or later developed. Each of base stations 104a-c may provide data services via one or more downlink channels, which may include one or more paging channels for each coverage area served by the base station. In one example, one or more of base stations 104a-c may additionally or alternatively be configured to transmit paging signal via one or more other downlink channels.

RAN 100 may also include one or more controllers (e.g., a base station controller, radio network controller, etc.) that may provide connectivity to core network 120 and may also help to control aspects of the RAN's base stations, such as aspects of antenna-system operation and/or air-interface operation. In one implementation, for instance, RAN 100 may include one or more separate controllers (e.g., a base station controller (BSC) or radio network controller (RNC)) that sit between base stations 104a-c and core network 120. In another implementation, each of base stations 104a-c may include an integrated controller. Other arrangements are possible as well, including arrangements in which at least a portion of the controller resides in core network 120.

Core network 120 may include network infrastructure (not shown) that provides connectivity between WCDs serviced by base stations 104a-c and transport network 110 and may also help to control aspects of RAN operation. Depending on the radio access technology employed, this network infrastructure may take various forms. For example, if RAN 100 is operating in accordance with an LTE protocol, core network 120 may include entities such as a mobility management entity (MME), a serving gateway (SGW), a packet data network gateway (PGW), and/or a home subscriber server (HSS). As another example, if RAN 100 is operating in accordance with a CDMA protocol, core network 120 may include entities such as a mobile switching center (MSC), a packet data serving node (PDSN), a home location register (HLR), and/or a visitor location register (VLR). The core network's infrastructure may take various other forms as well.

As further shown in FIG. 1, core network 120 may include a paging controller 122 that functions to page WCDs operating in RAN 100 in response to receiving requests to initiate communications with the WCDs, perhaps from transport network 110 or other WCDs. Paging controller 122 may also perform various other functions, examples of which include receiving and processing registration signals and updating a WCD registration database that includes information indicative of paging areas for each WCD connected to RAN 100.

Paging controller 122 may take the form of any server or other entity that is arranged to carry out these functions. For example, if RAN 100 is a CDMA network, paging controller 122 may be an MSC. Alternatively, paging controller 122 may be an MME if RAN 100 is an LTE network. Other examples may also be possible. FIG. 1 depicts paging controller 122 as a separate server that sits on (or is otherwise coupled to) core network 120. In an alternate example, however, one or more other network entities may be arranged to carry out these functions and thus serve as paging controller 122.

To facilitate paging, WCD 102, as well as other WCDs in RAN 100, may register with core network 120, perhaps by sending a registration signal to paging controller 122. WCD 102 may send the registration signal periodically or upon entering a new coverage area. The registration signal may include information indicative of the coverage area in which WCD 102 is located. In FIG. 1, for example, WCD 102 is located in coverage area A, which may be in a first paging zone. WCD 102 may send to core network 120 a registration signal that includes information indicating that the WCD 102 is in the first paging zone (e.g., an identifier of coverage area A). Paging controller 122 may then update the WCD registration database to indicate that WCD 102 is located in the first paging zone and/or coverage area A.

In response to receiving a request to initiate a communication with WCD 102, paging controller 122 may access the WCD registration database to identify the coverage area in which WCD 102 last registered. In response to identifying coverage area A as the coverage area of last registration, paging controller 122 may define one or more paging areas in which to page WCD 102. Paging controller 122 may employ various techniques for paging a WCD operating in RAN 100. In one example, paging controller 122 may employ a zone-based paging scheme, a distance-based paging scheme, or any other paging technique now known or later developed that is suitable for paging a WCD in RAN 100.

Regardless of the paging technique employed, paging controller 122 may define a number of paging areas for paging WCD 102 that matches the allowed maximum number of page attempts for paging WCD 102. For example, if a maximum number of page attempts is three, paging controller 122 may define three paging areas, with each area corresponding to an iteration of a paging process. To illustrate this example, paging controller 122 may determine that a first paging area includes coverage area A, a second paging area includes coverage area A and coverage area B, and a third paging area may include coverage area A, coverage area B, and coverage area C. (It should be understood, however, that each paging area may include more or fewer coverage areas).

Figure 2:
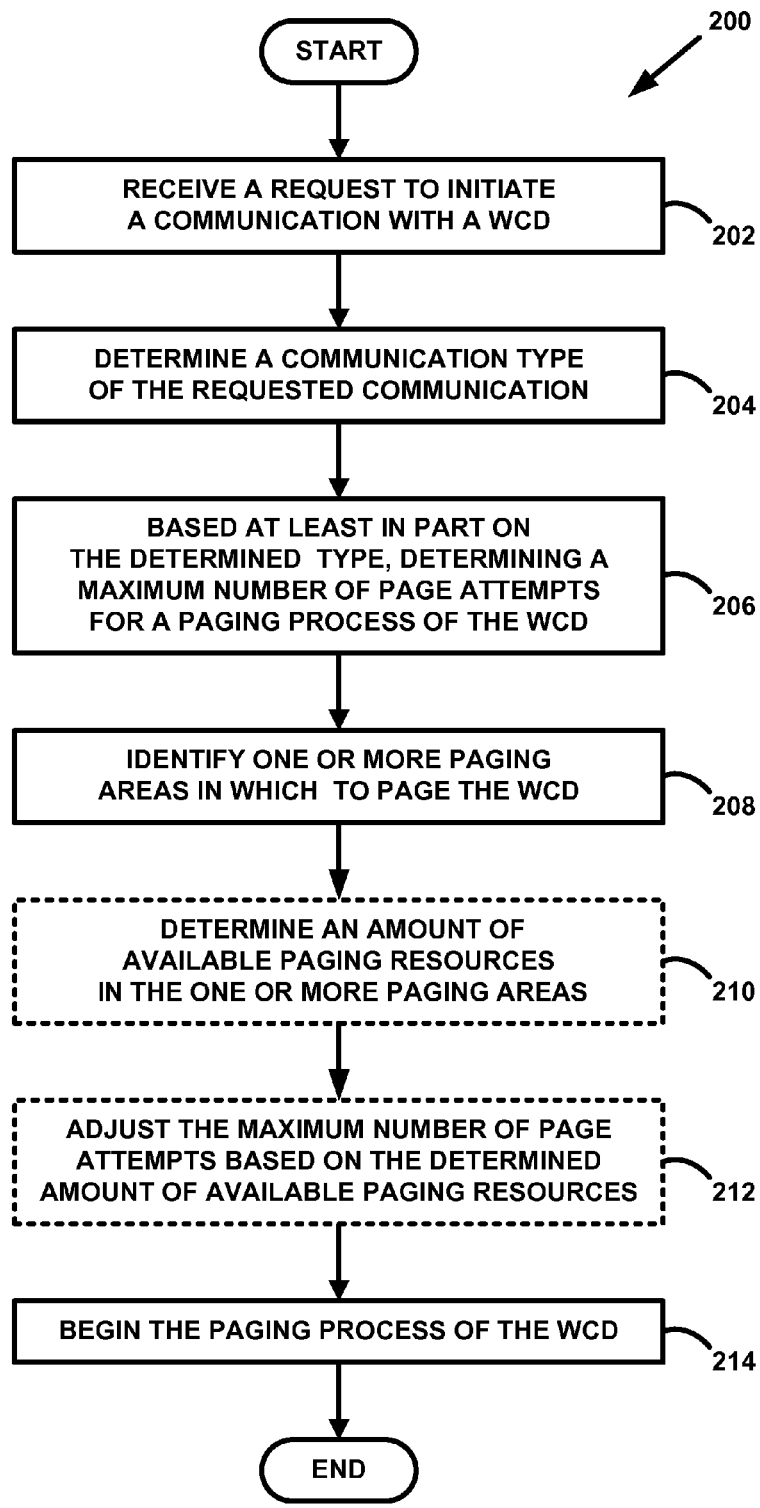
FIGS. 2, 3A, and 3B are flow charts depicting functions that can be carried out in accordance with example embodiments of the disclosed methods.

Turning now to FIG. 2, a flow chart is shown to illustrate functions of method 200 that can be carried out in accordance with an example embodiment of the disclosed methods. For purposes of illustration only, these functions will be described with reference to RAN 100. It is to be understood, however, that method 200 may employed by a RAN configured to employ a different paging process as well.

As shown in FIG. 2, method 200 may begin at step 202 with paging controller 122 receiving a request to initiate a communication with a WCD, such as WCD 102. Paging controller 122 may receive the request from transfer network 110, another WCD, etc. The request may include information usable by paging controller 122 to page WCD 102 (i.e., to generate a paging signal), such as, for example, an identity of WCD 102 and an indication of the type of the requested communication. For instance, the request may include information indicating that the requested communication is one of a connection-dependent communication (e.g., a voice call, a video call, an Internet data session) or a connectionless communication (e.g., an SMS message, an IM, a data paging communication, a voice mail identification message). Other examples are possible as well.

At step 204, method 200 may continue with paging controller 122 determining a type of the requested communication. This determination may take various forms. In one implementation, for instance, paging controller 122 may determine that the type of the requested communication is one of two general communication types: (a) connection-dependent type or (b) connectionless type. In another implementation, paging controller 122 may determine the communication type of the requested communication as one of a set of specific communication types, such as a voice call, an SMS message, etc. Other types of requested communications may also be possible.

Paging controller 122 may carry out this determination function in various manners. According to one implementation, paging controller 122 may determine (or otherwise identify) the type of requested communication based on information included in the request to initiate the communication with WCD 102. Other implementations are possible as well.

At step 206, paging controller 122 may then determine a maximum number of page attempts for a paging process of WCD 102 based on at least the type of the requested communication. As previously described, the maximum number of page attempts may represent the maximum number of times paging controller 122 causes one or more of base stations 104a-c. Paging controller 122 may store the maximum number or page attempts in various ways. In one example, paging controller 122 stores information indicative of the maximum number of page attempts in an internal or external data storage. Other examples may also be possible.

In one example, paging controller 122 may determine that the maximum number of page attempts is a first positive integer in response to determining that the type of the requested communication is the connection-dependent type at step 202. Alternatively, in response to determining that the type of the requested communication is the connectionless type at step 202, paging controller 122 may determine that the maximum number of page attempts os a second positive integer, with the second positive integer being less than the first positive integer. For instance, the first positive integer may be three, and the second positive integer may be one. In this manner, paging controller 122 may conserve paging resources for connection-dependent communications, and possibly other downlink traffic as well, by limiting the number of pages transmitted to WCDs to initiate connectionless communications.

In another example, paging controller 122 may determine the maximum number of page attempts based on a specific type of communication. In this example, each of the one or more specific types of the requested communication, e.g., the voice call type, the SMS type, may each correspond to a specific maximum number of transmissions. For instance, the maximum number of page attempts for a voice call type communication may be three, the maximum number of page attempts for a video call type may be two, and the maximum number of page attempts for the SMS type may be one. In other examples, the maximum number of page attempts for each of these types may be greater than or less than the identified number, and other example types are possible as well. In general, however, the maximum number of page attempts for connection-dependent communications is greater than the maximum number of page attempts for connectionless communications. For instance, the maximum number of page attempts corresponding to the voice type is greater than the maximum number of page attempts corresponding to the SMS type. In the example, paging controller 122 determines the maximum number of page attempts equal to the maximum number of page attempts corresponding to the determined communication type.

At step 208, paging controller 122 may define one or more paging areas in which to page WCD 102. Paging controller 122 may carry out this process in various manners. In one implementation, paging controller 122 may define the one or more paging areas based on a last-known location of WCD 102, such as an identify of the coverage area in which WCD 102 last registered. For example, paging controller 122 may first access the WCD registration database to identify the WCD's last-known location. In turn, paging controller 122 may use the last-known location to define the one or more paging areas in which to page WCD 102 using any technique now known or later developed, including zone-based and distance-based paging techniques.

Paging controller 122 may determine the number of paging areas to define for paging WCD 102 using any technique now known or later developed. In one example, paging controller 122 may define a number of paging areas for paging WCD 102 that matches the determined maximum number of page attempts for the paging process of WCD 102, in which case paging controller 122 defines the paging area(s) after determining the maximum number of page attempts. In another example, paging controller 122 may simply define a predefined default number of paging areas (e.g., 3 paging areas) for paging WCD 102, in which case paging controller 122 may define the paging area(s) before or after determining the maximum number of page attempts. Other examples are possible as well. For purposes of illustration only, the following description assumes that paging controller 122 defines at least a first paging area for paging WCD 102 that includes coverage area A. And then depending on the implementation and/or the type of requested communication, paging controller 122 may additionally define a second paging area that includes coverage areas A-B and also perhaps a third paging area that includes coverage areas A-C.

At step 210, paging controller 122 may optionally determine the amount of paging resources available in the defined one or more paging areas. Paging controller 122 may perform this determination in various manners.

In one implementation, paging controller 122 may receive information indicative of the status of paging channel(s) (or other downlink channel(s) used to page WCDs) included in the defined one or more paging areas, and paging controller 122 may then use this information to determine the amount of paging resources available in each of the define or more paging areas. This implementation may take various forms.

As one example, paging controller 122 may receive information indicative of the data rate of each paging area in a given paging area and then determine that the amount of available paging resources for the given paging area is equivalent to the lowest paging-channel data rate in the given paging area. For instance, if the first paging area includes three paging channels (one for each of three sectors within coverage area A, perhaps), paging controller 122 may receive information from base station 104a indicating that a first paging channel has a first data rate, a second paging channel has a second data rate, and a third paging channel has a third data rate. If the first data rate is greater than the second data rate and the second rate is greater than the third data rate, paging controller 122 may determine the amount available paging resources is the third data rate.

As another example, paging controller 122 may receive information indicative of the data rate of each paging area in a given paging area and then determine that the amount of available paging resources for the given paging area is corresponds to a statistic of the paging-channel data rates, such as an average of the first data rate, the second data rate, and the third data rate.

As yet another example in which RAN 100 is an LTE network, paging controller 122 may receive information indicative of the data rate of each downlink channel in a given paging area and then determine the amount of available paging resources in the given paging area based on the data rates for all downlink channels in the given paging area. Other examples may also be possible, including the possibility that RAN 100 determines the amount of paging resources for a given paging area based on metrics other than data rate (e.g., paging channel occupancy).

After determining the amount of available paging resources in each respective paging area, paging controller 122 may also determine a representative amount of available paging resources for the one or more defined paging areas collectively. Paging controller 122 may perform this function in various manners. In one example, paging controller 122 may determine the representative amount of available paging resources to be equivalent to the lowest or highest amount of available paging resources of the one or more paging areas. In another example, paging controller 122 may determine the representative amount of available paging resources to be equivalent to an average of the amount of available paging resources of the one or more paging areas. Other examples may also be possible.

At step 212, paging controller 122 may optionally adjust the determined maximum number of page attempts prior to initiating the paging process for WCD 102 based on the determined amount of paging resources. Paging controller 122 may perform this adjustment in various manners.

In one implementation, paging controller 122 may compare the determined amount of available paging resources to a threshold amount of paging resources when the determined type of the requested communication is the connectionless type. In one example, paging controller 122 may adjust the maximum number of page attempts by increasing the maximum number of page attempts when the determined amount of available paging resources is greater than or equal to the threshold amount of paging resources. For instance, consider an example in which paging controller 122 determines that the maximum number of page attempts is two. If the determined amount of available paging resources is greater than or equal to the threshold amount, paging controller 122 may adjust the maximum number of page attempts by increasing the maximum number of page attempts to three. If the determined amount of paging resources is less than the threshold amount of paging resources, paging controller 122 may not adjust the maximum number of page attempts.

In an alternative example of this implementation, paging controller 122 may adjust the maximum number of page attempts by reducing the maximum number of page attempts when the determined amount of available paging resources is less than or equal to the threshold amount of paging resources. For example, consider an example in which paging controller 122 determines that the maximum number of page attempts is two. If the determined amount of available paging resources is less than the threshold amount of paging resources, paging controller 122 may reduce the maximum number of page attempts to one. If the determined amount of paging resources is greater the threshold amount of paging resources, paging controller 122 may not adjust the maximum number of page attempts.

Thus, as the previous two examples illustrate, RAN 100 may transmit more pages for connectionless communications to WCD 102 when the determined amount of available paging resources is greater than or equal to the threshold amount. By further basing the maximum number of page attempts on the determined amount of paging resources, paging controller 122 may dynamically determine the maximum number of transmissions, thereby resulting in more pages without adversely affecting other pages and/or data signals. In another embodiment, paging controller 122 may perform optional step 212 regardless of the determined type of the requested communication.

Once paging controller 122 has determined the maximum number of page attempts, method 200 may proceed to step 214, and paging controller 122 may page WCD 102 according to the paging process. In implementing the paging process, paging controller 122 may initiate a first page of WCD 102 by generating a paging signal and transmitting it to any base station that serves the coverage area(s) included in the first paging area, such as base station 104a. In turn, base station 104a may page WCD 102 by making a first transmission of the paging signal in coverage area A.

If WCD 102 receives the first transmission of paging signal, WCD 102 may send an acknowledgment signal to base station 104a, which may subsequently send the acknowledgement signal to paging controller 122. Upon receiving the acknowledgment signal, paging controller 122 may send a signal to another component of core network 120 to establish a communication link with WCD 102.

On the other hand, if WCD 102 does not receive the first transmission of paging signal, paging controller 122 may not receive the acknowledgement signal, in which case paging controller 122 may continue with the paging process by determining whether to initiate a retransmission of the paging signal based on the maximum number of transmissions. Paging controller 122 may carry out this function in various manners.

Figure 3A:
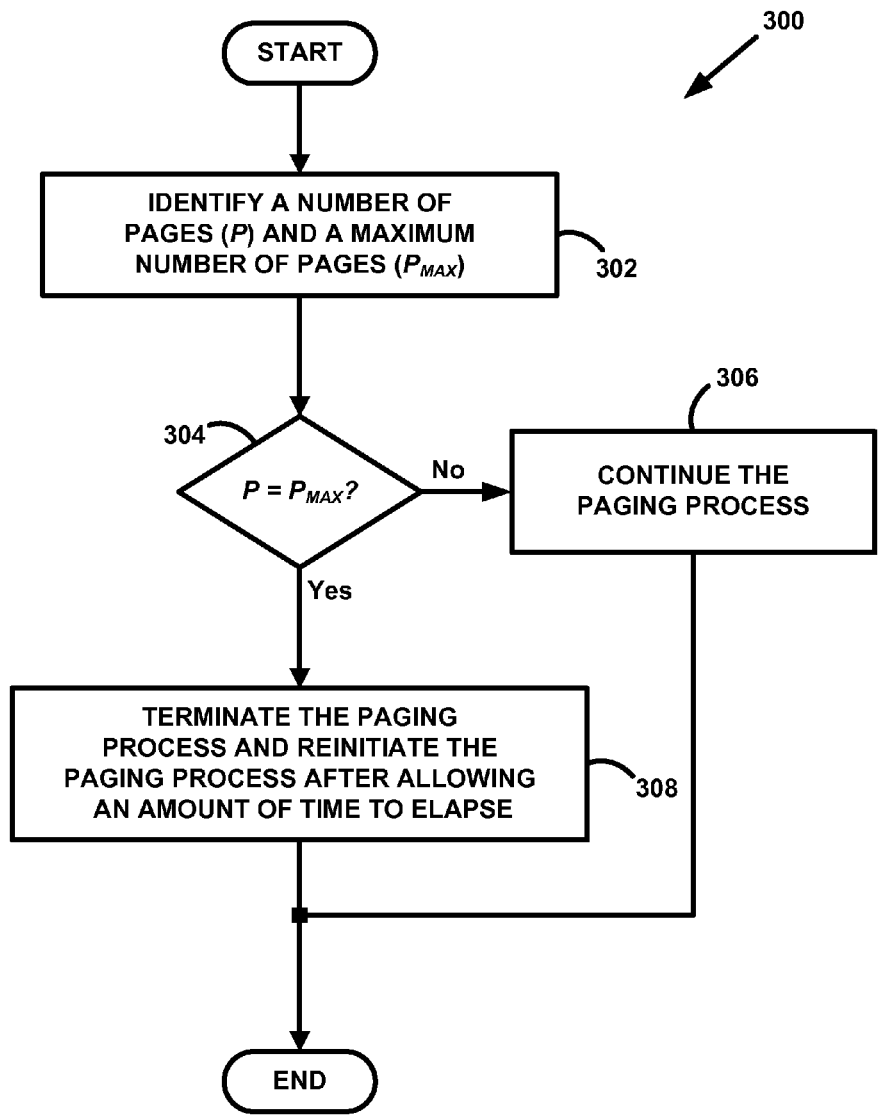

Referring now to FIG. 3A, a flow chart is shown to illustrate functions of one possible method 300 that can be carried out by paging controller 122 to determine whether to send a subsequent page to a WCD after paging controller does not receive an acknowledgment of the first transmission of the paging signal.

At step 302, paging controller 122 may identify a number of page attempts that have already occurred, which is represented as variable P in FIG. 3A. The number of page attempts represents the number of times paging controller 122 has caused one or more of base stations 104a-c to page WCD 102. Paging controller 122 may also, when performing step 302, identify the determined maximum number of page attempts for the paging process of WCD 102, which is represented as variable $P_{MAX}$ in FIG. 3. Paging controller 122 may identify the number of page attempts and the maximum number of page attempts in various ways. As one example, paging controller 122 may access internal or external data storage to identify the maximum number of page attempts of the paging signal.

At step 304, method 300 includes paging controller 122 determining whether the number of page attempts equals the maximum number of page attempts. Paging controller 122 may then take different actions based on the result of this determination.

For instance, if paging controller 122 determines at step 304 that the number of page attempts is not equal to the maximum number of transmissions, paging controller 122 may proceed to step 306 and continue the paging process of WCD 102 by causing retransmission of the paging signal. Paging controller 122 may carry out this retransmission in various manners. For example, when the number of page attempts that have already occurred equals 1 (thereby indicating that WCD 102 did not acknowledge the first transmission of the paging signal), paging controller 122 may initiate a retransmission of the paging signal in the second paging area by sending the paging signal to base stations 104a-b, which serve coverage areas A-B. In turn, base stations 104a-b may transmit the paging signal in coverage areas A-B. Other examples are also possible.

Alternatively, if paging controller 122 determines at step 304 that the number of page attempts equals the maximum number of page attempts of the paging signal, paging controller 122 may proceed to block 308 and terminate the paging process of WCD 102. Thereafter, paging controller 122 may then determine whether (and when) to initiate a subsequent paging process of WCD 102 in various manners.

In one embodiment, paging controller 122 does not reinitiate a subsequent paging process for a connectionless communication. In this embodiment, one of transport network 110 or core network 120 may instead store the connectionless communication and provide the connectionless communication to WCD 102 upon WCD 102 contacting RAN 100. In another embodiment, after terminating the initial paging process of WCD 102, paging controller 122 may then reinitiate a new paging process of WCD 102 after allowing an amount of time to elapse. The amount of time may generally be longer than the amount of time between successive pages, perhaps as long as thirty minutes, one hour, or even several hours.

Figure 3B:
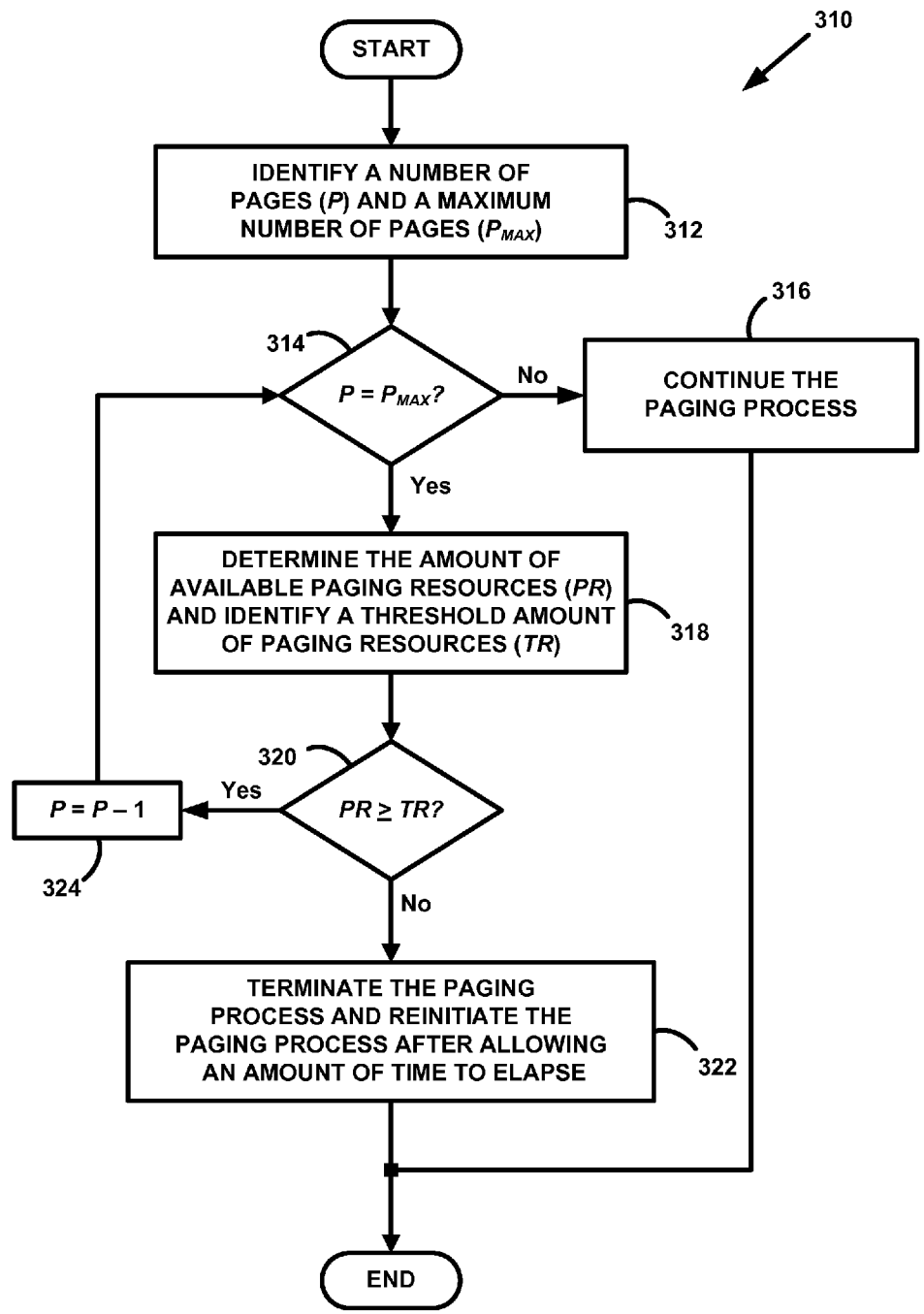

Turning now to FIG. 3B, a flow chart is shown to illustrate functions of another possible method 310 that can be carried out by paging controller 122 to determine whether to send a subsequent page to a WCD after paging controller does not receive an acknowledgment of the first transmission of the paging signal.

At step 312, method 310 includes paging controller 122 identifying a number of page attempts and a maximum number of page attempts. Paging controller 122 may perform the functions of steps 312 by performing the same or substantially similar steps as those described with respect to step 302 of method 300.

At step 314, method 310 includes paging controller 122 determining whether the number of page attempts equals the maximum number of page attempts. Paging controller 122 may then take different actions based on the result of this determination.

For instance, if paging controller 122 determines at step 314 that the number of page attempts is not equal to the maximum number of transmissions, paging controller 122 may proceed to step 316 and continue the paging process of WCD 102. At step 316, paging controller 122 may perform the same or substantially similar functions as described with respect to step 306 of method 300.

Alternatively, if paging controller 122 determines at step 304 that the number of page attempts equals the maximum number of page attempts of the paging signal, paging controller 122 may proceed to step 318 and determine the amount of available paging resources, which is represented as variable PR in FIG. 3B. In performing this step, paging controller 122 may perform the same or substantially similar functions as described with respect to step 210. In this manner, paging controller 122 may determine a current amount of available paging resources (i.e., the amount of available paging resources after initiating the paging process). Alternatively, if paging controller 122 performed step 210 when performing method 200, paging controller 122 may instead identify the previously determined amount of available paging resources when performing step 318.

At step 318, paging controller 122 may also identify a threshold amount of paging resources, which is represented as variable TR in FIG. 3. In this example, the threshold amount of paging resources may represent an amount of available channel resources at or above which a transmission of the paging signal is unlikely to adversely affect or delay delivery of other signals on the downlink channels of one or more of base stations 104a-c. Paging controller 122 may identify the threshold amount in various ways. In one example, paging controller 122 may identify the threshold amount of paging resources by accessing internal or external data storage.

At step 320, paging controller 122 may determine whether the amount of available paging resources is greater than or equal to a threshold amount of paging resources. In response to determining that the amount of available paging resources is greater than or equal to the threshold amount of paging resources, paging controller 122 may, at step 324, subtract one from the number of page attempts. Paging controller 122 may then return to step 314 and, upon determining that the number of page attempts is now less than the maximum number of page attempts, paging controller 122 may continue the paging process of WCD 102 at step 316. In this manner, paging controller 122 may dynamically determine whether to retransmit the paging signal without adversely affecting or delaying the delivery of data signals to other WCDs by RAN 100.

In response to determining that the amount of paging resources is less than the threshold amount of paging resources, paging controller 122 may proceed to step 322, where paging controller may perform functions that are the same as or substantially similar to the functions described with respect to step 308 of method 300.

Figure 4:
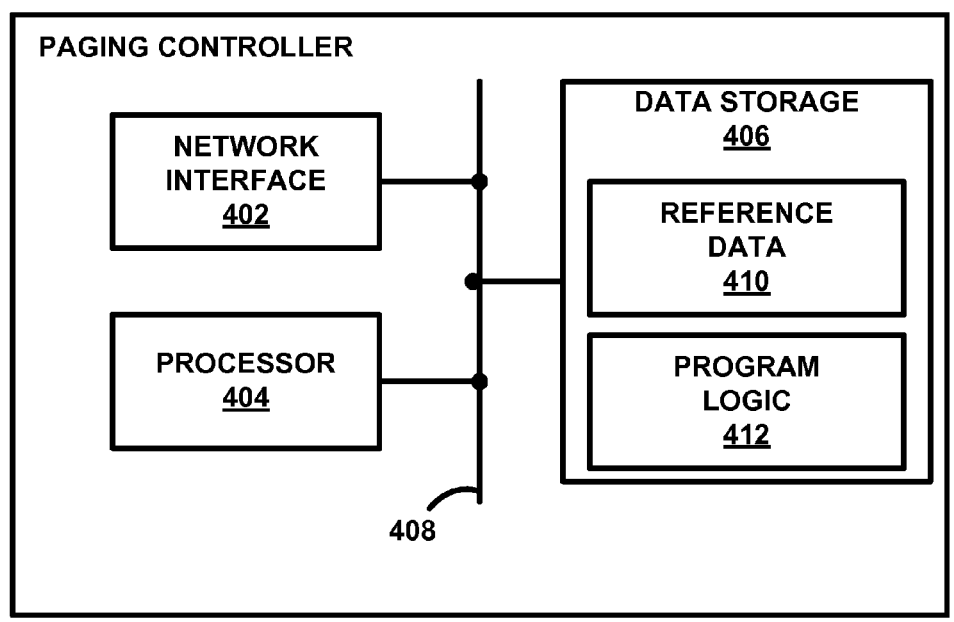
FIG. 4 is a simplified block diagram showing functional components that may be included in an example paging controller to facilitate implementation of the disclosed methods.

FIG. 4 is a simplified block diagram showing functional components that may be included in example paging controller, such as paging controller 122, to facilitate implementation of the disclosed methods. As shown, paging controller 122 may include a network communication interface 402, a processing unit 404, and data storage 406, all linked together via a system bus, network, or other connection mechanism 408. Paging controller 122 may include other components as well.

Referring to FIG. 4, network communication interface 402 generally functions to connect paging controller 122 with core network 120 and enable paging controller 122 to engage in communication with various other entities, such as a remote device (via transport network 110) or base stations 104a-c (via one or more other core-network entities and/or BSCs). Network communication interface 402 may take any suitable form for carrying out these functions, examples of which include an Ethernet interface, a serial bus interface (e.g., Firewire, USB 2.0, etc.), a chipset and antenna adapted to facilitate wireless communication, and/or any other interface that provides for wired and/or wireless communication. Network communication interface 402 may also include multiple interfaces. Other configurations are possible as well.

Processing unit 404 may comprise one or more processor components, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), and/or any other processor components now known or later developed. Processing unit 404 may be integrated in whole or in part with other components of paging controller 122.

Data storage 406 may then comprise one or more non-transitory computer readable storage mediums, such as volatile data storage mediums (e.g., random access memory (RAM), registers, and/or cache) and/or non-volatile data storage mediums (e.g., read only memory (ROM), a hard-disk drive, a solid-state drive, flash memory, and/or an optical-storage device). Data storage 406 may also be integrated in whole or in part with other components of paging controller 122.

As shown in FIG. 4, data storage 406 may be arranged to contain reference data 410 and program logic 412. Reference data 410 may comprise various data usable by processing unit 404 to carry out various functions described herein. For example, reference data 410 may include data about the wireless carrier network's paging areas, such as identification, location, and/or serving-entity data for the paging areas, WCD registration data, and one or more paging processes. As another example, reference data 410 may include information indicative of: (i) one or more determined numbers of page attempts; one or more determined maximum numbers of page attempts; a maximum number of page attempts for each type of requested communication; one or more amounts of available paging resources; and one or more threshold amounts of paging resources. Other examples are possible as well.

Program logic 412 may then comprise machine language instructions or the like that may be executed or interpreted by processing unit 404 to carry out various functions described herein. For example, program logic 412 may be executable by processing unit 404 to (a) receive a request to initiate a communication with a WCD, (b) determine a communication type of the requested communication, (c) based at least in part on the determined communication type, determine a maximum number of page attempts for a paging process of WCD 102, and (d) initiate the paging process of the WCD. Program logic 412 may be executable by processing unit 404 to carry out various other functions as well.

While example embodiments have been described above, those skilled in the art will understand that changes and modifications may be made to these embodiments without departing from the true scope and spirit of the present invention, which is defined by the claims.

What is claimed is:

1. A method comprising:
    receiving, by a radio access network (RAN), a request to initiate a communication with a wireless communication device (WCD);
    in response to receiving the request, the RAN determining a type of the communication;
    based at least in part on the determined type, the RAN determining a maximum number of page attempts for a paging process of the WCD,
    wherein the determined type is one of a connection-dependent type or a connectionless type, and
    (i) if the determined type is the connection-dependent type, then the RAN determines that the maximum number of page attempts is a first positive integer, and
    (ii) if the determined type is the connectionless type, then the RAN determines that the maximum number of page attempts is a second positive integer, wherein the second positive integer is less than the first positive integer; and
    the RAN initiating the paging process of the WCD.

2. The method of claim 1, wherein the communication type is the connectionless type if the communication is a short message service communication.

3. The method of claim 1, wherein, prior to initiating the paging process, the method further comprises:
    the RAN identifying one or more paging areas in which to page the WCD;
    the RAN determining an amount of available paging resources in the identified one or more paging areas;
    the RAN adjusting the maximum number of page attempts based on the determined amount of available paging resources.

4. The method of claim 1, wherein the paging process comprises:
    the RAN determining whether a number of page attempts is equal to the maximum number of page attempts; and
    in response to the RAN determining that the number of page attempts is equal to the maximum number of page attempts, the RAN terminating the paging process and reinitiating the paging process of the WCD after allowing an amount of time to elapse.

5. The method of claim 1, wherein the paging process comprises:
    the RAN determining whether a number of page attempts is equal to the maximum number of transmissions; and
    in response to the RAN determining that the number of page attempts is equal to the maximum number of page attempts:
    the RAN identifying one or more paging areas in which to page the WCD;
    the RAN determining an amount of available paging resources in the identified one or more paging areas;
    the RAN determining whether the determined amount of paging resources is less than a threshold amount of paging resources; and
    in response to determining that the amount of paging resources is less than the threshold amount of paging resources, the RAN subtracting one from the number of page attempts and continuing the paging process of the WCD.

6. A non-transitory computer-readable medium having stored thereon instructions that are executable by a processing unit to carry out functions comprising:
    receiving a request to initiate a communication with a wireless communication device (WCD);
    determining a type of the communication;
    determining a maximum number of page attempts for a paging process of the WCD based at least in part on the determined type,
    wherein the determined type is one of a connection-dependent type or a connectionless type, and
    (i) if the determined type is the connection-dependent type, then the determined maximum number of page attempts is a first positive integer, and
    (ii) if the determined type is the connectionless type, the determined maximum number of page attempts is a second positive integer, wherein the second positive integer is less than the first positive integer: and
    initiating the paging process of the WCD.

7. The non-transitory computer-readable medium of claim 5, wherein the communication type is the connectionless type if the communication is a short message service communication.

8. The non-transitory computer-readable medium of claim 5, wherein, prior to initiating the paging process, the functions further comprise:
    identifying one or more paging areas in which to page the WCD;
    determining an amount of available paging resources in the identified one or more paging areas;
    adjusting the maximum number of page attempts based on the determined amount of available paging resources.

9. The non-transitory computer-readable medium of claim 5, wherein, to implement the paging process, the functions further comprise:
    determining whether a number of page attempts is equal to the maximum number of transmissions; and
    in response to determining that the number of page attempts is equal to the maximum number of page attempts, terminating the paging process of the WCD and reinitiating the paging process of the WCD after allowing an amount of time to elapse.

10. The non-transitory computer-readable medium of claim 5, wherein, to implement the paging process, the functions further comprise:
    determining whether a number of page attempts is equal to the maximum number of page attempts; and
    in response to determining that the number of page attempts is equal to the maximum number of page attempts:
    identifying one or more coverage areas in which to page the WCD;
    determining an amount of available paging resources in the identified one or more coverage areas;
    determining whether the determined amount of paging resources is greater than or equal to a threshold amount of paging resources; and
    in response to determining that the amount of paging resources is less than or equal to the threshold amount of paging resources, (i) subtracting one from the number of page attempts and (ii) continuing the paging process of the WCD.

11. A network entity comprising:
  a network communication interface configured to provide connectivity with a wireless carrier network;
  a processing unit; data storage; and
  program instructions stored in the data storage and executable by the processing unit to carry out functions comprising:
  (a) receiving, via the network communication interface, a request to initiate a communication with a wireless communication device (WCD);
  (b) determining a type of the communication;
  (c) determining a maximum number of page attempts for a paging process of the WCD based at least in part on the determined type,
    wherein the determined type is one of a connection-dependent type or a connectionless type, and
    (i) if the determined type is the connection-dependent type, then the determined maximum number of page attempts is a first positive integer, and
    (ii) if the determined type is the connectionless type, the determined maximum number of page attempts is a second positive integer, wherein the second positive integer is less than the first positive integer; and
  (d) initiating the paging process of the WCD.

12. The entity of claim 11, wherein the type is the connectionless type if the communication is a short message service communication.

13. The network entity of claim 11, wherein the functions further comprise, prior to determining the maximum number of page attempts:
  identifying one or more paging areas in which to page the WCD;
  determining an amount of available paging resources in the identified one or more paging areas; and
  adjusting the maximum number of page attempts based on the determined amount of available paging resources.

14. The network entity of claim 11, wherein, to implement the paging process, the functions further comprise:
  determining whether a number of page attempts is equal to the maximum number of transmissions; and
  in response to determining that the number of page attempts is equal to the maximum number of transmission, terminating the paging process of the WCD and reinitiating the paging process of the WCD after allowing an amount of time to elapse.

15. The network entity of claim 14, wherein, to implement the paging process, the functions further comprise:
  determining whether a number of page attempts is equal to the maximum number of transmissions; and
  in response to determining that the number of page attempts is equal to the maximum number of transmission:
  identifying one or more paging areas in which to page the WCD;
  determining an amount of available paging resources in the identified one or more paging areas;
  determining whether the determined amount of paging resources is greater than or equal to a threshold amount of paging resources; and
  in response to determining that the amount of paging resources is less than or equal to the threshold amount of paging resources, (i) subtracting one from the number of page attempts and (ii) continuing the paging process of the WCD.

\* \* \* \* \*